Patented Dec. 5, 1922.

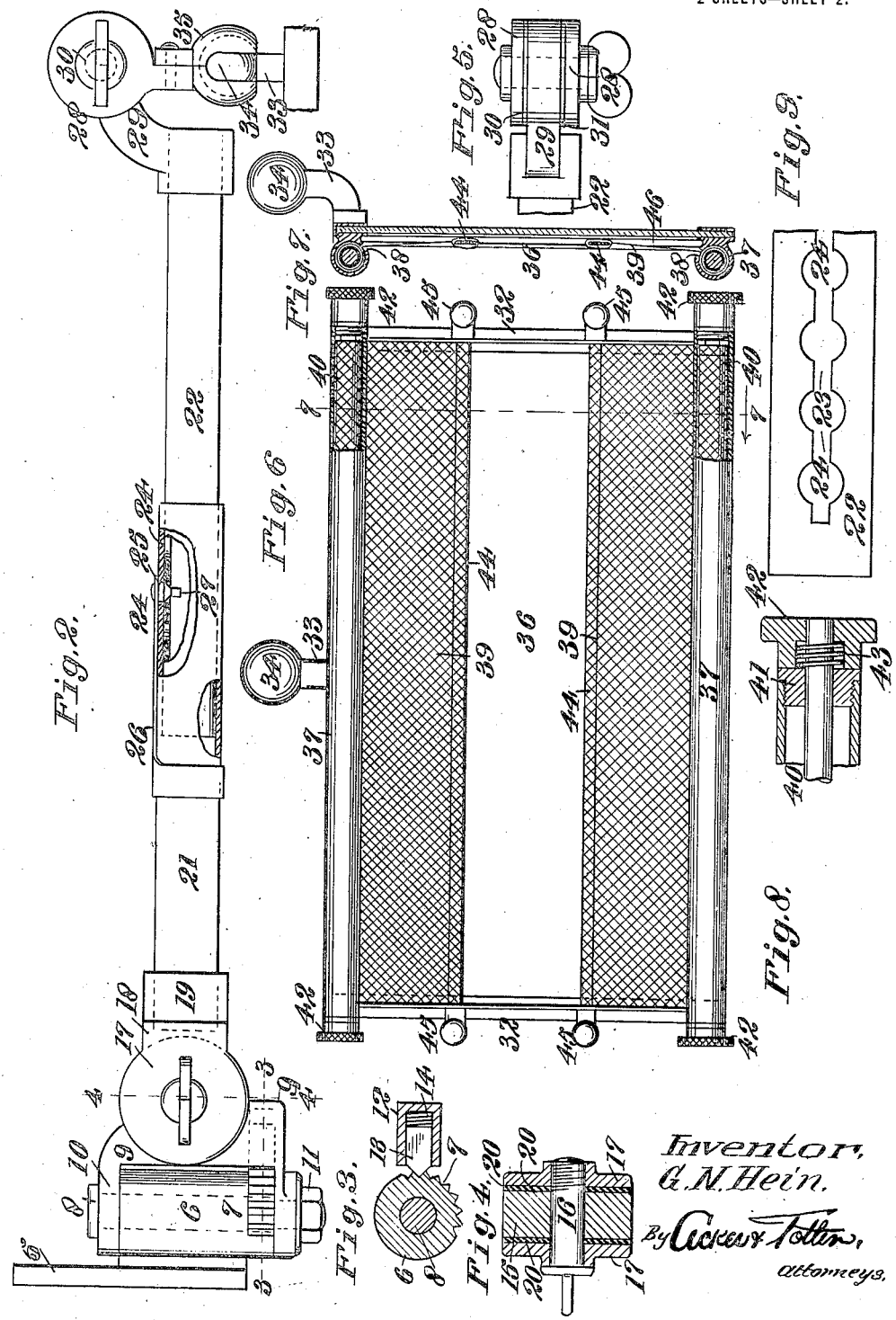

1,437,656

UNITED STATES PATENT OFFICE.

GEORGE N. HEIN, OF SAN FRANCISCO, CALIFORNIA.

DRIVING SHIELD FOR MOTOR VEHICLES.

Application filed April 26, 1922. Serial No. 556,786.

*To all whom it may concern:*

Be it known that I, GEORGE N. HEIN, a citizen of the United States, residing at the city and county of San Francisco, and State of California, have invented certain new and useful Improvements in Driving Shields for Motor Vehicles, of which the following is a specification.

In the driving of automobiles the glare of the sun either direct or reflected passing through the wind shield or striking the eyes of the driver, when the sun is at a height to not be excluded by the top or cover, renders the operation of the vehicle dangerous, as the operator's eyes become blinded by the strong light.

In night driving the glare of approaching machines often renders the operation of the vehicle dangerous, as such light, when not controlled blinds the driver of the approaching vehicle.

The present invention relates to a portable driving shield adapted for attachment to a fixed portion of a vehicle, whereby the operator may, at his will and as conditions require, shift the same to exclude the blinding sun's rays or reflection, either passing through the wind shield or striking him from the side of the vehicle.

This present shade is adapted for universal adjustment and to be held in fixed position when adjusted and includes elements whereby a driving or sight opening therethrough may be varied as to width and position on the shade, at the will of the driver. A further object is to provide a construction in the form of an adjustable shade which when not in use may be swung or moved to an inoperative position, and which is at all times within convenient reach of the vehicle operator.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 2 is a view in detail of the adjustable and extensible shade supporting mechanism with the extension lock partly in section.

Fig. 3 is a cross sectional view on line 3—3 of Fig. 2, illustrating the pawl and ratchet mechanism for retaining the extensible arm in its pivotal position when swung on its vertical axis.

Fig. 4 is a sectional view on the line 4—4 of Fig. 2, illustrating the friction joint for retaining the extensible arm in its adjusted position when swung on a horizontal axis.

Fig. 5 is a top plan view of the swinging friction joint at the free end of the adjustable arm.

Fig. 6 is a view in elevation, partly in section, of the sun shade.

Fig. 7 is a vertical section taken on line 7—7 of Fig. 6.

Fig. 8 is a detail sectional view of one end of one of the curtain mounting rolls.

Fig. 9 is a view in detail of the inner member of the telescoping arm, illustrating the pin receiving slot and retaining notches.

Figure 1:
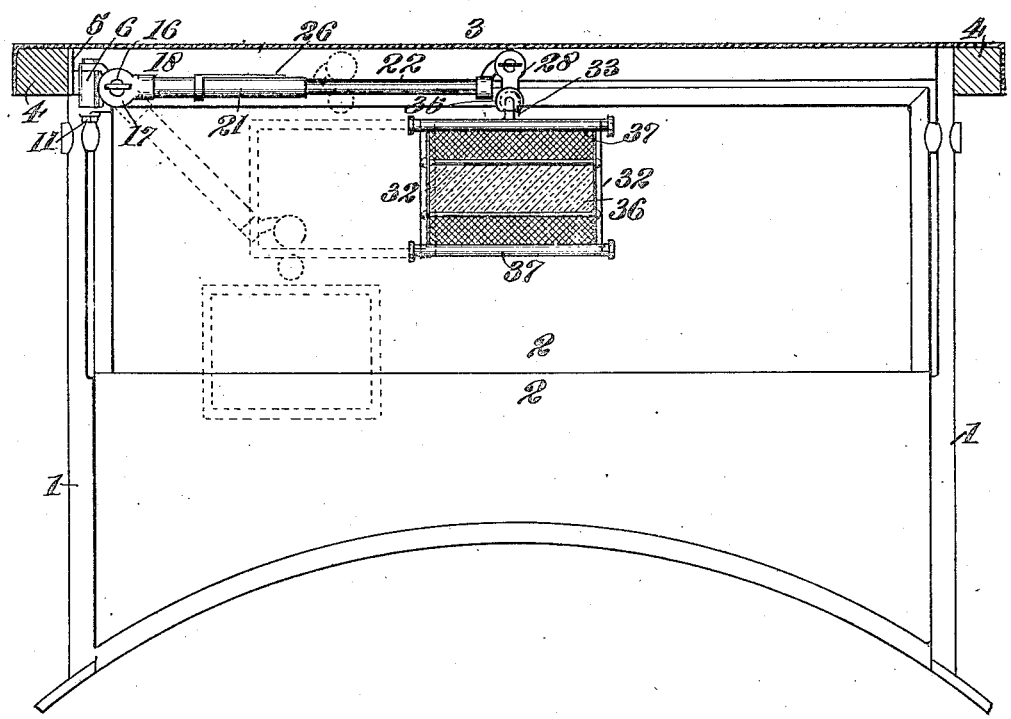
Fig. 1 is a view in rear elevation of a vehicle wind shield illustrating the top or cover in cross section with my present invention illustrated as secured to one of the top bows and swung into position in rear of the wind shield.

Referring more particularly to the drawings, wherein like characters of reference designate corresponding parts, 1 indicates the supporting standards of a vehicle wind shield mounting the upper and lower shield members 2 of the well known form. The vehicle cover or top in the present invention is illustrated as at 3, supported by the side bows or frame members 4.

In the present illustration the preferred embodiment of my invention is secured or attached in any suitable manner to one of the supporting bows or top side frame members 4, particularly the one adjacent the driver's side of the vehicle, and while this type of bracket is illustrated, it is to be understood that any type of fastening means may be employed or adapted for securing to the top frame member, or, if desirable, to one of the standards 1, as installations may require.

The attaching bracket comprises a securing plate 5 from which extends a tubular vertically disposed boss 6 serrated for a portion of its periphery, as at 7, and through which extends the fulcrum pin 8.

A bifurcated hinge member 9 spans said boss 6 and through the apertured ears 10 thereof pass the fulcrum pin 8 held in position by a tension nut 11. The hinge member 9 opposite the serrated portions 7 is provided with a bore 12 mounting a spring actuated pawl or plunger 13 outwardly pressed by a spring 14.

This construction provides the vertical fulcrum on which the mechanism is adapted to swing.

The member 9 is also formed opposite the ears 10 with a hinge extension 15, transversely through which extends a tension bolt 16 which passes through apertures in the spaced ears 17 of a member 18 provided with a tubular recess.

Between the inner faces of the ears 17 and the outer surface of the members 15 are positioned friction disks 20 adapted on the adjustment of the bolt 16 to vary the tension of the hinge connection afforded between these members. This construction affords the vertical fulcrum for the telescoping shade supporting arm.

Received in the tubular recess 19 is one end of an adjustable shade supporting arm, consisting of the members 21 and 22, the latter adapted for reception within the free end of the former. The member 22 at one end is provided on its upper surface with a longitudinal slot 23 which is enlarged as at 24 at intervals throughout its length. A locking pin 25 operates through the aperture in the free end of the member 21 and is normally held inwardly by the tension of a spring finger 26 secured to the member 21.

The pin 25 has a reduced inner end 27 of a diameter corresponding to the width of the slot 23 and the enlarged upper end of said pin is of a diameter corresponding to the enlarged portions 24 of said slot, whereby when the pin is seated the enlarged end rests within said enlarged portions of the slot, retaining the member 22 in its adjusted position, the reduced portion affording a guide precluding the axial movement of the rod when its length is varied.

To the outer end of the rod 22 is secured a friction hinge joint, similar to the one affording a vertical adjustment for the arm at its rear end, and the same consists of the spaced ears 28 adapted for extending one on either side of a member 29, the members 28 and 29 being adapted to fulcrum about a pin 30 passing therethrough and friction disks 31 are positioned between the co-operating faces of the members 28 and 29.

The sun shade comprises an open rectangular frame 32, upwardly from the upper transversely disposed frame member of which extends an arm 33 connected with the member 28 through a ball and socket joint, the ball 34 being carried by the member 33 and the socket 35 being carried by the members 28.

The frame carries a glass or other transparent closure 36, and on its inner top and bottom edges is formed with the curtain roller concealing shells 37, each opening, as at 38, adjacent the inner face of the glass 36. Within each of the shells 37 is adapted to be wound an opaque flexible curtain 39, each being supported on a roller 40, the ends of which are adapted to rotate within bearing openings in the shell end closure members 41, and on their opposite ends the rollers 40 carry the knurled finger pieces 42, which provide means for rolling the curtain on the respective rolls 40.

A tension spring 43 is mounted between each member 41 and 42 to retain the roller in its adjusted position. The free edge of each shade or curtain carries a stiffening rod 44, the ends of which are provided with finger pieces 45, and said stiffening rods are adapted to slide within the vertical slots 46 at the opposite sides of the frame 32 on its inner face.

It will be observed that the terminal edges of the respective curtains are wrapped around the respective stiffening members 44 in such a manner as to press against the surface of the frame 32 and this friction contact is adapted to hold the free edge of the lower curtain in its adjusted position.

It will be observed that by my present construction the vehicle driver is provided with a sun shade capable of being positioned at any point desired, due to the joint construction and telescoping construction of the hanger; also that the shade is provided with means for affording a sight or driving opening of any desired width, enabling the driver to position the same, whereby safe driving even against the lights of approaching vehicles may be accomplished without the glare blinding the eyes of the operator.

This present construction is also designed for excluding side lights when the vehicle is travelling at an angle to the path of travel of the sun, and when the sun is either rising or setting. which light is very disagreeable and annoying to the operator.

It is obvious that the closure 36 may be of clear or translucent glass, when translucent glass is employed the amber shade has been found to be preferable.

Having thus described my invention, what I claim as new and desire to protect by Letters Patent of the United States is:—

1. In combination with a driving shield, comprising a frame provided on one face with a pair of rollers disposed parallel with the frame top and bottom edges, a curtain on each roller, a stiffening rod associated with the free end of each curtain, guides within which the said rods operate, and means for mounting said shield on a vehicle to permit the swinging thereof to a position across the path of driving vision of the vehicle operator.

2. In combination with a driving shield, comprising a frame provided on one face with roller concealing shells disposed parallel with its top and bottom edges and each provided with a curtain passage facing each other, a roller and curtain within each shell, a stiffening rod associated with the free end of each curtain, guides within which the said rods operate, and means for mounting said shield on a vehicle to permit the swinging thereof to a position across the path of driving vision of the vehicle operator.

3. In combination with a driving shield, comprising a frame provided on one face with roller concealing shells disposed parallel with its top and bottom edges, and each provided adjacent the inner face of said frame with a curtain passage, said passages facing each other, a roller and curtain within each shell, the free edge of the respective curtains operating through said respective passages and adapted for movement to vary the frame opening, a finger grip member associated with each roller and extending beyond the corresponding ends of the shells, means for guiding and frictionally retaining the free edges of said curtains in their adjusted position over said frame opening, and means for securing said shield to permit the swinging thereof immediately in advance of and across the path of driving vision of the vehicle operator.

In testimony whereof I have signed my name to this specification.

GEORGE N. HEIN.